United States Patent Office 3,594,377
Patented July 20, 1971

3,594,377
CONDENSATION PRODUCTS OF N - (3 - THIAZOLIDINYLMETHYL) - NITROGEN BASE COMPOUNDS
Douglas I. Relyea, Pompton Plains, N.J., assignor to Uniroyal, Inc., New York, N.Y.
No Drawing. Filed Nov. 7, 1967, Ser. No. 681,115
Int. Cl. C07d 51/04
U.S. Cl. 260—250                                8 Claims

ABSTRACT OF THE DISCLOSURE

The invention relates to reaction products of beta-mercaptoethylamine with an amide, imide, hydrazide or amine compound and formaldehyde to form an N-(3-thiazolidinylmethyl) nitrogen base compound.

---

The present invention relates to a new class of chemical compounds having the general formula:

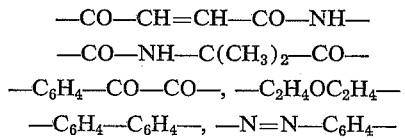

wherein $R_1$ and $R_2$ may be the same or different and each represents a lower alkyl group having 1 to 8 carbon atoms, an aryl group, an aroyl group, an acyl group, an acylamino group, or an aroylamino group, or $R_1$ and $R_2$ may compositely represent

—CO—CH=CH—CO—NH—

—CO—NH—C(CH$_3$)$_2$—CO—

—C$_6$H$_4$—CO—CO—,  —C$_2$H$_4$OC$_2$H$_4$—

—C$_6$H$_4$—C$_6$H$_4$—,  —N=N—C$_6$H$_4$— or —CO—A—CO— where A is a divalent group such as a substituted or non-substituted alkylene group such as ethylene or vinylene, or an arylene group such as o-phenylene, o-tolylene, 1,2-naphthylene, 2,3-naphthylene or 5,6-norbornylene. The present invention relates also to a method of preparing said chemical composition by reacting a nitrogen base compound having a basic dissociation constant between $1\times10^{-15}$ and $1\times10^{-5}$ and containing an amide, imide, hydrazide or amine group with formaldehyde and beta-mercaptoethylamine or a salt thereof.

In an article by Taguchi et al., Chem. Pharm. Bull. (Tokyo) Volume 10, pages 245–246 (1962), it was shown that beta-mercaptoethylamine, or a salt thereof, reacts with formaldehyde in aqueous medium at room temperature to form 3,3′-methylenebisthiazolidine.

In said prior art reaction, the beta-mercaptoethylamine and formaldehyde may be considered as reacting to form thiazolidine, which then reacts with additional formaldehyde to form methylenebisthiazolidine, as illustrated in the following reaction scheme:

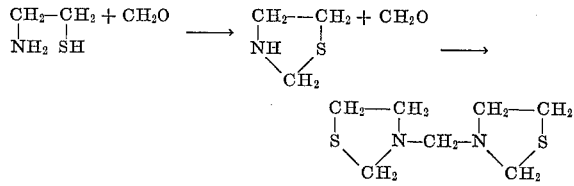

The present invention relates to the unobvious addition of a second nitrogen base compound to a reaction mixture of said beta-mercaptoethylamine and formaldehyde at the start of reaction to form a significant yield of an unsymmetrical or mixed condensation product called an N-(3-thiazolidinylmethyl) nitrogen base compound. An example of this reaction using phthalimide as the second nitrogen base compound is illustrated as follows:

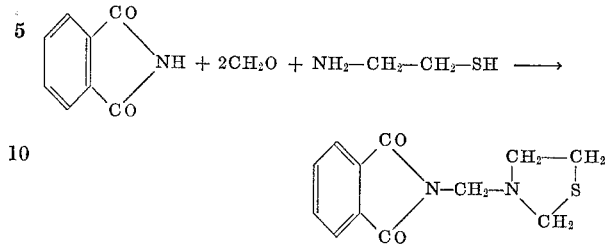

The N-(3-thiazolidinylmethyl)nitrogen base compound is prepared by reacting formaldehyde, beta-mercaptoethylamine (or a derivative hydrolyzable to beta-mercaptoethylamine such as the hydrochloric acid, sulfuric acid or acetic acid salt of beta-mercaptoethylamine) and a nitrogen base compound possessing a basic ionization constant between $1\times10^{-15}$ and $1\times10^{-5}$ other than beta-mercaptoethylamine in an aqueous medium. While the reaction as written calls for one mole of formaldehyde for each mole of the two nitrogen compounds, an excess of formaldehyde (for example from 50% to 150% excess) may be used to help carry the reaction toward completion. The temperature of reaction is not critical and conveniently may be from about 0° C. to 100° C. The reaction is generally carried out at room temperature (20–30° C.).

As noted previously the reaction is carried out in an aqueous medium. The aqueous solvent can be water or the 37% (by weight) solution of formaldehyde known as Formalin. In addition, water and a second solvent miscible with water (such as methanol, ethanol, isopropanol or dioxane) can be used as solvents to dissolve all the reactants under the conditions used in the reaction.

The basic nitrogen compound used in this invention to react with the formaldehyde and beta-mercaptoethylamine has the general formula

where $R_1$ and $R_2$ in the moiety are the same or different and each may represent a lower alkyl group having 1 to 8 carbon atoms; a cycloalkyl group having 3 to 8 carbon atoms preferably cyclohexyl; an aryl group such as phenyl, tolyl, naphthyl; an aroyl group such as benzoyl; an acyl group having 2 to 8 carbon atoms, preferably acetyl or propionyl; an acylamino having 2–8 carbon atoms in the acyl portion of the group such as acetyl unsymmetrical dimethyl hydrazine; or an aroylamino such as benzoylamino. $R_1$ and $R_2$ compositely represent the general formula —B—CO—A—CO— wherein when B is nothing, A is orthophenylene; 1,2 vinylene; 1,2 ethylene; 5,6 norbornylene; N,1-iminoiso-propyl; 1,2 naphthylene; 2,3 naphthylene; when B is —NH—, A is 1,2 vinylene; or when B is —N=N—, A is orthophenylene; or biphylene. Some examples of these compounds are:

—CO—CH=CH—CO—NH—

—CO—NH—C(CH$_3$)$_2$—CO—,  o-C$_6$H$_4$—CO—CO—

=C$_4$H$_8$O, 2,2′-C H$_4$C$_6$H$_4$-(2,2′-diphenylene)

o-N=N—C$_6$H$_4$—(orthoazo phenylene)

The chemical compounds included in the present invention have been found to be effective fungicides.

Examples 1 through 8 illustrate the preparation of the new chemicals of the invention.

3

EXAMPLE 1

This example illustrates the preparation of N-(3-thiazolidinylmethyl)maleimide. A solution of 48.6 g. (0.500 mole) of maleimide in 100 ml. of water and 200 ml. of ethanol was treated at room temperature with a solution of 56.8 g. (0.500 mole) of beta-mercaptoethylamine hydrochloride in 76 ml. (1.00 mole) of 37% Formalin, 100 ml. of water and 100 ml. of ethanol. The mixture was adjusted to a pH between 6 and 7 by the addition of 15 ml. of 40% aqueous sodium hydroxide. The clear solution was allowed to stand at room temperature for sixteen hours. Filtration separated 19.0 g. (19.2%) of N-(3-thiazolidinylmethyl)maleimide, M.P. 96.2–98.0. Recrystallization from 75 ml. of 95% ethanol gave 15 g. of purified material, M.P. 97.4–98.8°.

*Analysis.*—Calcd. for $C_8H_{10}N_2O_2S$ (percent): C, 48.47; H, 5.09; N, 14.14; S, 16.18. Found (percent): C, 47.97; H, 4.84; N, 14.08; S, 16.82.

When applied to tomato plants under run-off conditions as a 0.2% solution, N-(3-thiazolidinylmethyl)maleimide gave over 80% control of tomato blight compared with an equal number of unsprayed plants under the same conditions. It is also effective in the control of *Staphylococcus aureus* bacteria.

EXAMPLE 2

This example illustrates the preparation of 1-(3'-thiazolidinylmethyl) - 1,2,3,6 - tetrahydropyridazine-3,6-dione. A solution of 56 g. of maleic hydrazide and 40 g. of sodium hydroxide in 300 ml. of 37% aqueous formaldehyde was treated under a nitrogen atmosphere with 56.8 g. of beta-mercaptoethylamine hydrochloride at room temperature. Within two hours a white crystalline mass formed. Filtration gave 46 g. (43%) of crude 1-(3'-thiazolidinylmethyl) - 1,2,3,6 - tetrahydropyridazine-3,6-dione, M.P. 146–151°. Recrystallization from 50:50 (volume/volume) dioxaneethyl acetate gave 30.5 g. of pure product, M.P. 147–148°.

*Analysis.*—Calcd. for $C_8H_{11}N_3O_2S$ (percent): C, 45.07; H, 5.20. Found (percent): C, 44.95; H, 5.09.

This product shows activity similar to that disclosed in Example 1.

EXAMPLE 3

This example illustrates the preparation of 1-(3'-thiazolidinylmethyl)benzotriazole. In 300 ml. of 37% aqueous formaldehyde were dissolved 34.1 g. of beta-mercaptoethylamine hydrochloride, 35 ml. of 30% aqueous sodium hydroxide and 35.7 g. of benzotriazole. A white solid precipitated within two minutes. The reaction mixture was allowed to stand three hours at room temperature. The crude product was separated by filtration and recrystallized from a mixture of 375 ml. each of water and ethanol to give 42.8 g. (65%) of pure product, M.P. 111–113°.

*Analysis.*—Calcd. for $C_{10}H_{12}N_4S$ (percent): C, 54.52; H, 5.49; N, 25.43; S, 14.56. Found (percent): C, 54.35; H, 5.47; N, 25.53; S, 14.81.

This material, administered at 51–150 mg./kg. of body weight, is effective in decreasing the harmful effects of ionizing radiation on white mice.

EXAMPLE 4

This example illustrates the preparation of N-(3-thiazolidinylmethyl)phthalimide. To a solution of 56.8 g. of beta-mercaptoethylamine hydrochloride in 75 ml. of water was added a solution of 92.6 g. of the potassium salt of phthalimide in 76 ml. of 37% Formalin and 125 ml. of water. The clear solution was allowed to stand one day at room temperature, then was heated three days at 96.2° C. and finally cooled in a refrigerator. Filtration separated 36 g. (29%) of crude product. Recrystallization from 200 ml. of ethanol gave 25 g. of pure material, M.P. 89–90°.

*Analysis.*—Calcd. for $C_{12}H_{12}N_2O_2S$ (percent): C, 58.04; H, 4.87; N, 11.28; S, 12.92. Found (percent): C, 57.87; H, 4.94; N, 10.88; S, 12.82.

This product shows activity similar to that of the material prepared in Example 1.

EXAMPLE 5

This example illustrates the preparation of 3-(3'-thiazolidinylmethyl) - 55,5 - dimethylhydantoin. A solution of 64.1 g. of 5,5-dimethylhydantoin in 250 ml. of water and 76 ml. of 37% Formalin was treated with a solution of 56.8 g. of beta-mercaptoethylamine hydrochloride in 75 ml. of water. The solution was made neutral by the addition of 40% aqueous sodium hydroxide solution, allowed to stand briefly at room temperature and then allowed to stand at 4° C. Filtration gave 23 g. (20%) of crude product. Recrystallization from 75 ml. of ethyl acetate gave pure material, M.P. 121–123°.

*Analysis.*—Calcd. for $C_9H_{15}N_3O_2S$ (percent): C, 47.14; H, 6.60; N, 18.32; S, 13.99. Found (percent): C, 47.42; H, 6.67; N, 18.07; S, 13.90.

When applied to tomato plants under run-off conditions as a 0.2% solution, this product gave over 80% control of tomato blight (*Alternaria solani*), as compared with an equal number of unsprayed plants under the same conditions.

EXAMPLE 6

This example illustrates the preparation of N-(3-thiazolidinylmethyl)succinimide. Solutions of 49.5 g. of succinimide in 200 ml. of water and 76 ml. of 37% Formalin and of 56.8 g. of beta-mercaptoethylamine hydrochloride in 75 ml. of water were combined and made neutral by the addition of 40% aqueous sodium hydroxide. The solution was allowed to stand briefly at room temperature and then set in a 4° C. refrigerator. Filtration gave 48 g. (48%) of crude product which was then recrystallized from 125 ml. of 60% ethanol to give pure product (M.P. 48–50°), M.P. mixed with 3,3'-methylenebisthiazolidine, 28–35°.

*Analysis.*—Calcd. for $C_8H_{12}N_2O_2S$ (percent): C, 47.98; H, 6.04; N, 13.99; S, 16.02. Found (percent): C, 47.73; H, 6.61; N, 13.92; S, 15.94.

When applied to tomato plants under run-off conditions as a 0.2% solution, this product gave over 80% control of tomato blight (*Alternaria solani*), as compared with an equal number of unsprayed plants under the same conditions.

EXAMPLE 7

This example illustrates the preparation of endo-1,2,3,6-tetrahydro-3,6-methano-N-(thiazolidinylmethyl) - phthalimide. To a solution of 81.6 g. of endobicyclo[2.2.1]-5-heptene-2,3-dicarboximide in 1600 ml. of 50% aqueous ethanol was added 76 ml. of 37% Formalin and 56.8 g. of beta-mercaptoethylamine hydrochloride in 100 ml. of water. The solution was neutralized with 20 g. of sodium hydroxide in 50 ml. of water and allowed to stand at room temperature. Filtration separated 60 g. (45%) of crude product, M.P. 81–84°. Recrystallization from 100 ml. of ethanol gave 50 g. of pure product, M.P. 83–84°.

*Analysis.*—Calcd. for $C_{13}H_{16}N_2O_2S$ (percent): C, 59.07; H, 6.10; N, 10.60; S, 12.13. Found (percent): C, 58.73; H, 6.04; N, 10.28; S, 12.83.

When applied to tomato plants under run-off conditions as a 0.2% solution, this product gave over 80% control of tomato blight (*Alternaria solani*), as compared with an equal number of unsprayed plants under the same conditions.

EXAMPLE 8

This example illustrates the preparation of N-(3-thiazolidinylmethyl)carbazole. To a solution of 50.2 of carbazole in 200 ml. of dimethylformamide was added a solution of 34.1 g. of beta-mercaptoethylamine hydrochloride in 50 ml. of 37% Formalin. The solution was allowed to stand 140 hours at room temperature. Successive filtrations separated 5.5 g. (10.6%) of 9,9'-methylenebiscarbazole, M.P. 297–301°; 10.1 g. (25.6%) of 3,3'-methylenedithiazolidine dihydrochloride, M.P. 185–187°; and 13.5 g. (17.4%) of N-(3-thiazolidinylmethyl) carbazole, M.P. 115.5–116°.

*Analysis.*—Calcd. for $C_{16}H_{16}N_2S$ (percent): C, 71.61; H, 60.01; N, 10.44; S, 11.95. Found (percent): C, 72.11; H, 5.81; N, 91.81; S, 11.89.

When applied to tomato plants under run-off conditions as a 0.2% solution this product gave over 80% control of tomato blight (*Alternaria solani*), as compared with an equal number of unsprayed plants under the same conditions.

The unsymmetrical addition or condensation products of the present invention are non-polymeric compounds having crystalling structures and sharp melting points.

Having thus described my invention, what I claim and desire to protect by Letters Patent is:

1. N-(3-thiazolidinylmethyl)maleimide.
2. 1-(3-thiazolidinylmethyl)-1,2,3,6 tetrahydropyridazine-3, 6-dione.
3. 1-(3'-thiazolidinylmethyl) benzotriazole.
4. N-(3-thiazolidinylmethyl) phthalimide.
5. 3-(3'-thiazolidinylmethyl)-5,5 dimethylhydantoin.
6. N-(3-thiazolidinylmethyl) succinimide.
7. Endo-1,2,3,6-tetrahydro-3,6 methano - N-1 (thiazolidinylmethyl)-phthalimide.
8. N-(3-thiazolidinylmethyl) carbazole.

References Cited

UNITED STATES PATENTS 3,433,641  3/1969  Margot _____ 260—250

NICHOLAS S. RIZZO, Primary Examiner

U.S. Cl. X.R.

260—306.7; 424—250